United States Patent [19]

Miller et al.

[11] 4,301,409
[45] Nov. 17, 1981

[54] SOLAR CELL ANOMALY DETECTION METHOD AND APPARATUS

[75] Inventors: Emmett L. Miller, Long Beach; Alex Shumka, La Canada; Michael K. Gauthier, Downey, all of Calif.

[73] Assignee: California Institute of Technology, Pasadena, Calif.

[21] Appl. No.: 118,627

[22] Filed: Feb. 4, 1980

Related U.S. Application Data

[63] Continuation of Ser. No. 913,016, Jun. 6, 1978, abandoned.

[51] Int. Cl.³ .............................................. G01R 1/04
[52] U.S. Cl. ................................. 324/158 D; 324/403
[58] Field of Search ........... 324/403, 405, 408, 158 R, 324/158 D, 158 T; 250/212

[56] References Cited

U.S. PATENT DOCUMENTS 3,039,056 6/1962 Mang et al. ..................... 324/158 D
4,051,437 9/1977 Lile et al. ........................ 324/158 D Primary Examiner—Michael J. Tokar
Attorney, Agent, or Firm—Freilich, Hornbaker, Wasserman, Rosen & Fernandez

[57] ABSTRACT

A method is provided for detecting cracks and other imperfections in a solar cell, which includes scanning a narrow light beam back and forth across the cell in a raster pattern, while monitoring the electrical output of the cell to find locations where the electrical output varies significantly. The electrical output can be monitored on a television type screen containing a raster pattern with each point on the screen corresponding to a point on the solar cell surface, and with the brightness of each point on the screen corresponding to the electrical output from the cell which was produced when the light beam was at the corresponding point on the cell. The technique can be utilized to scan a large array of interconnected solar cells, to determine which ones are defective.

10 Claims, 6 Drawing Figures

U.S. Patent    Nov. 17, 1981    Sheet 1 of 3    4,301,409
FIG. 1
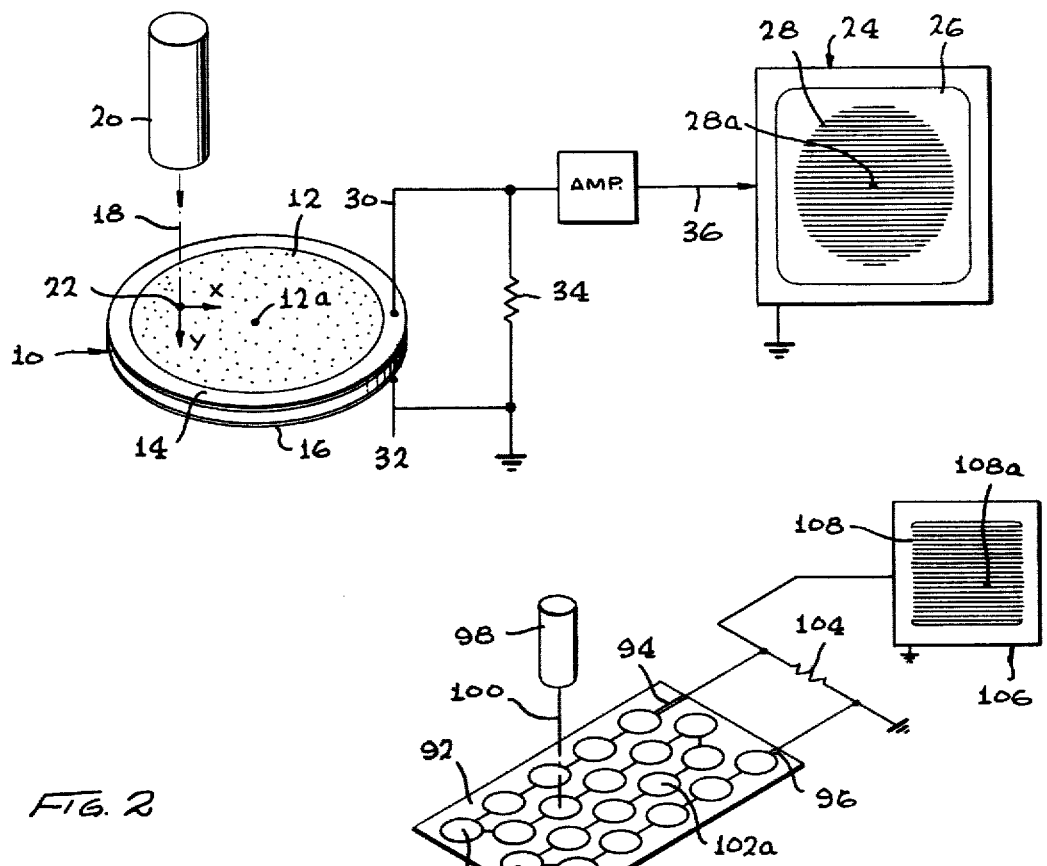
FIG. 2
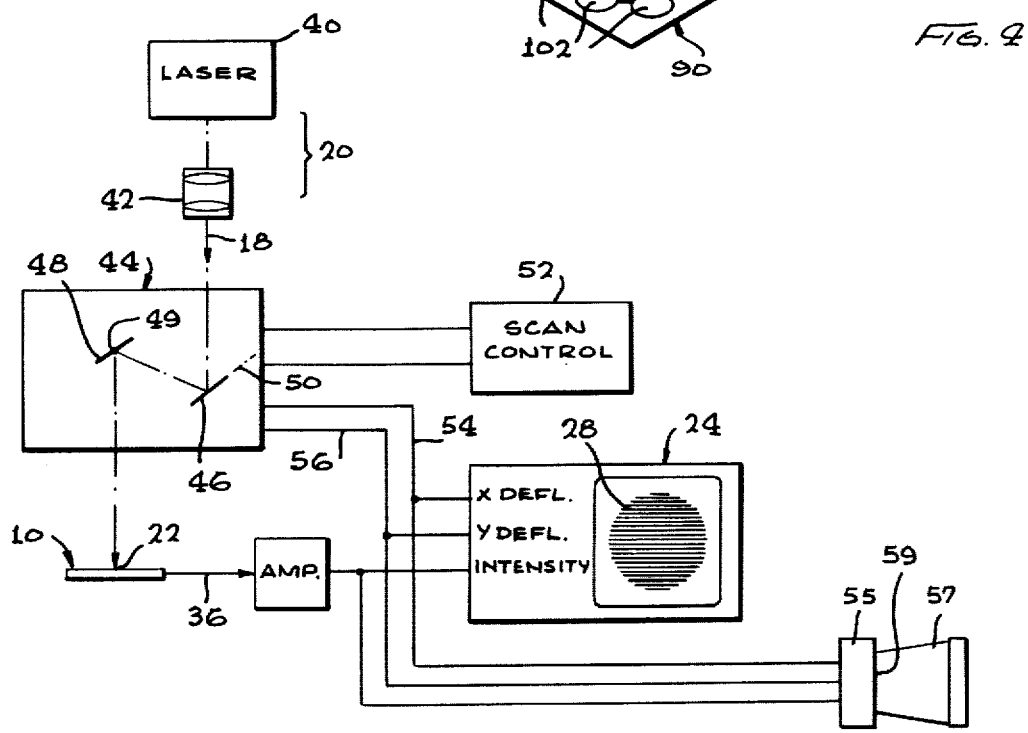
FIG. 4

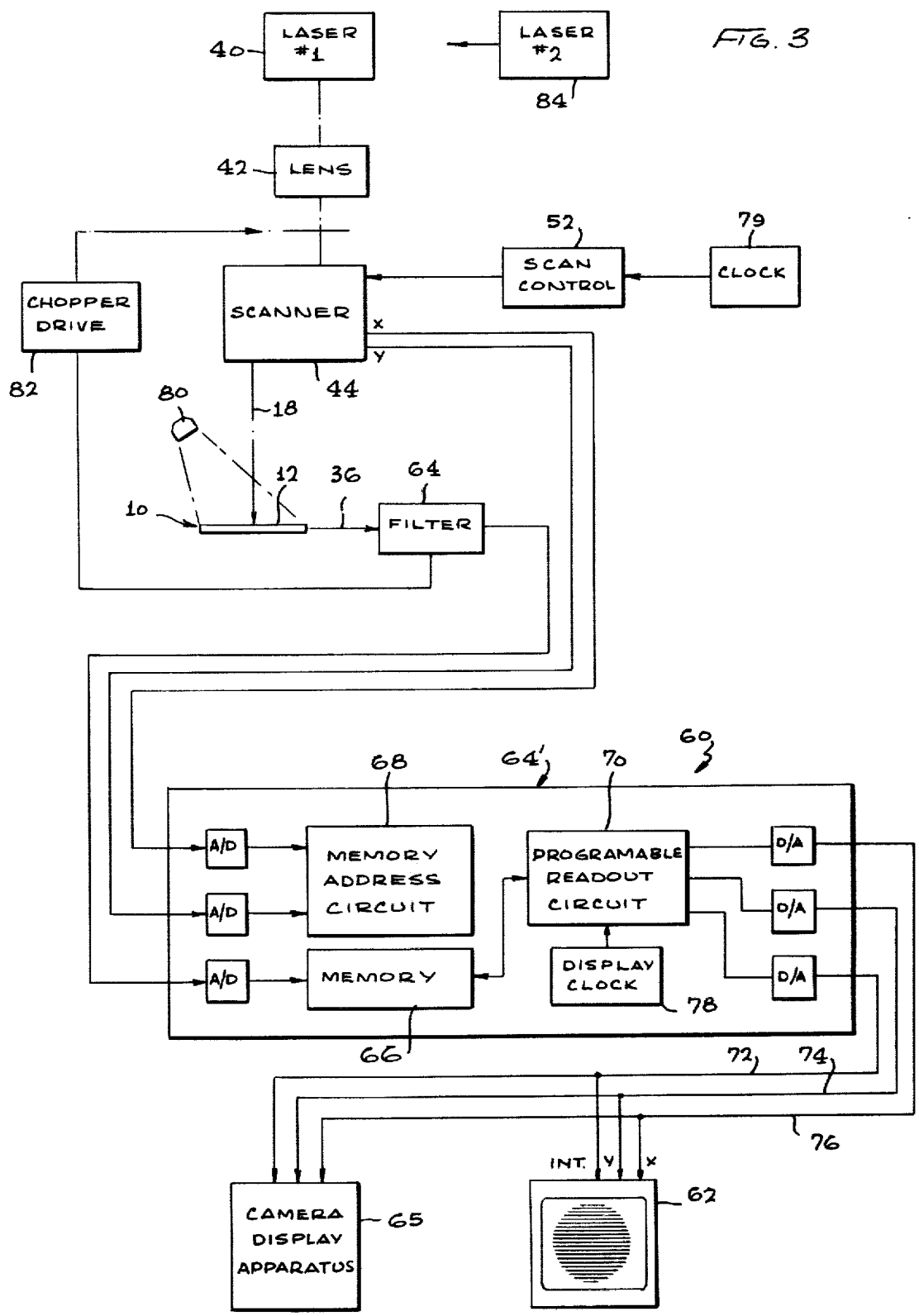

U.S. Patent  Nov. 17, 1981  Sheet 3 of 3  4,301,409
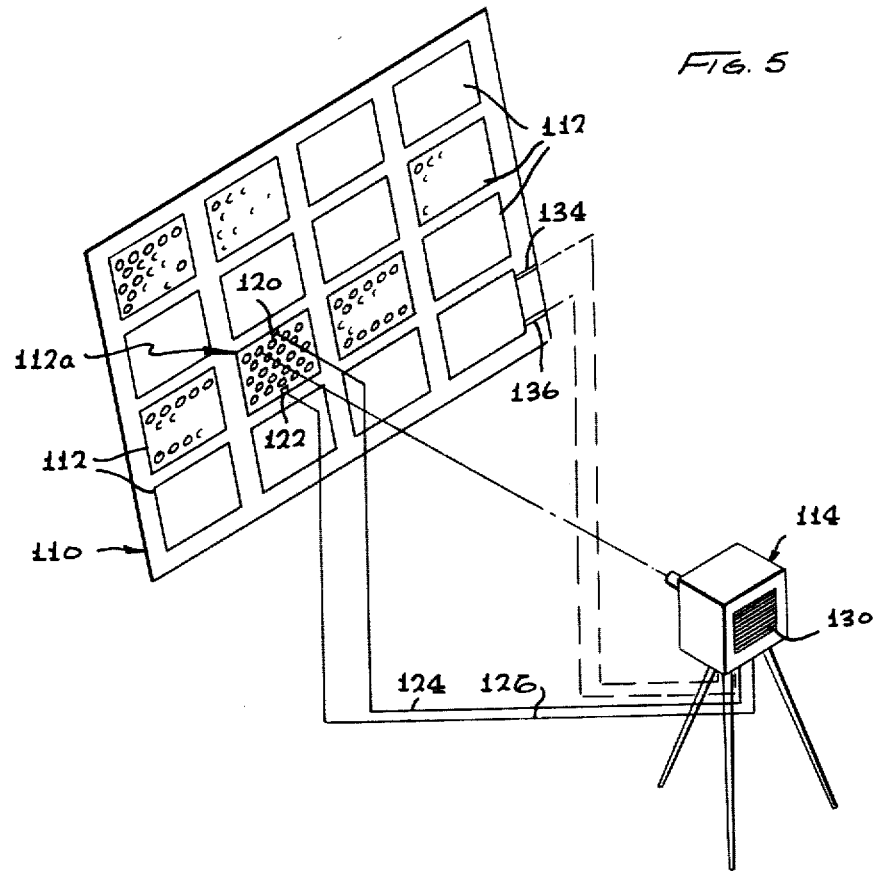
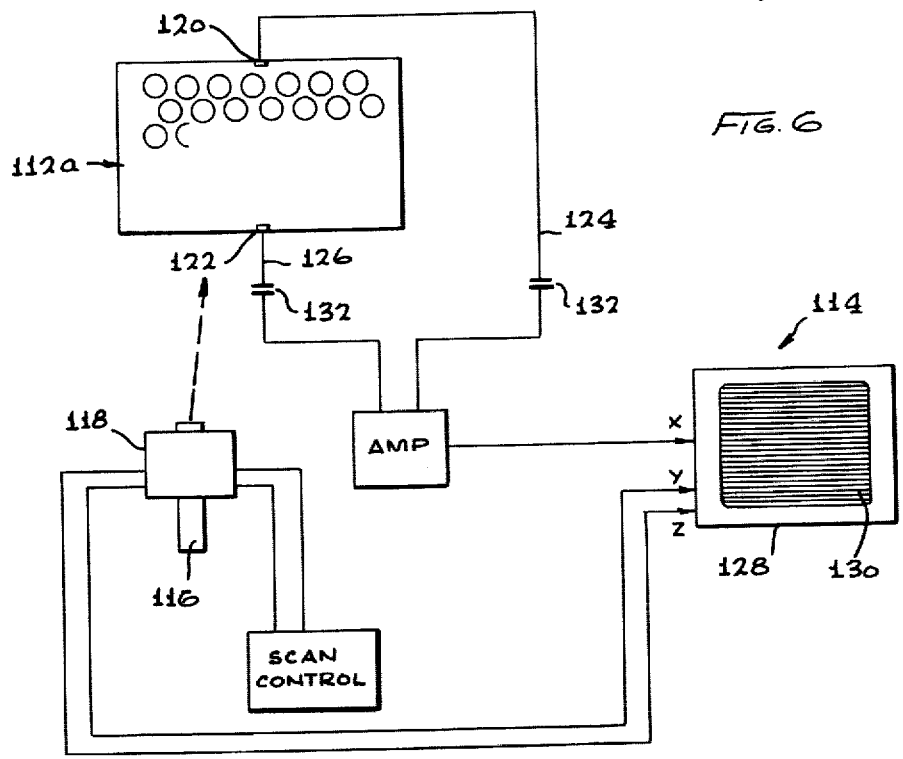

SOLAR CELL ANOMALY DETECTION METHOD AND APPARATUS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

This is a continuation of application Ser. No. 913,016, filed 6-06-78 and now abandoned.

BACKGROUND OF THE INVENTION

During both the development and production of solar cells, there is a need to investigate small portions of the cell to locate microcracks and other anamolies. Typical evaluation procedures have utilized the close examination of the solar cell surface through a magnifying device or even a scanning electron microscope, to detect imperfections. However, this procedure is very slow and consumes considerable time of personnel. An examination technique that effectively located anamolies in the surface of solar cells, in a rapid and economical manner, would greatly aid in the development and production of solar cells. If the technique could be utilized to locate a malfunctioning solar cell which was part of a large array of interconnected solar cells, in a rapid manner without requiring disconnection of the cells from one another, field servicing of solar cells arrays would be enhanced.

SUMMARY OF THE INVENTION

In accordance with one embodiment of the present invention, a technique is provided which enables the rapid and effective detection of anamolies in photosensitive devices such as solar cells. The method includes directing a light beam onto the solar cell, wherein the light beam is very narrow to cover only a very small area of the cell, and scanning the light beam over the surface of the cell. At the same time, the electrical output of the cell is monitored to sense variations in the output as the light beam covers different locations along the cell surface. Locations on the cell surface which give rise to unusual changes in cell output such as sharp or large decreases in cell output, provide an indication as to the locations of anamolies on the cell surface.

The monitoring of the cell surface can be enhanced by generating a video display containing a raster pattern wherein points on the raster pattern of the display correspond to points on the surface of the cell, and with the intensity at each point of the display corresponding to the intensity at a corresponding point on the cell when the light beam was incident at that point on the cell. Points of sharp change in output can be rapidly identified by a person viewing the screen.

The same technique utilized to analyze a single cell or portion thereof, can be utilized to analyze an array of solar cells, to determine which ones have a low output. This can be accomplished by scanning a light beam in a pattern to move from one cell to the next over the array, while monitoring the output of the array for unusual changes in the output.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified perspective view of a solar cell and testing apparatus thereof, in accordance with the present invention.

FIG. 2 is a more detailed block diagram of the apparatus of FIG. 1.

FIG. 3 is a block diagram of a test set-up in accordance with another embodiment of the invention.

FIG. 4 is a simplified perspective view of a test set-up for analyzing a group of interconnected solar cells in accordance with another embodiment of the invention.

FIG. 5 is a perspective view of a field test set-up for analyzing groups of solar cells arranged in modules that are, in turn, arranged in panels.

FIG. 6 is a block diagram of the apparatus of FIG. 5.

DESCRIPTION OF THE PREFERRED EMBODIMENTS

FIG. 1 illustrates a method and apparatus utilized to test a solar cell 10 to determine the locations of anamolies in the surface area of the cell. The solar cell has a large photosensitive surface 12, and has a pair of electrodes 14, 16 which can deliver an electrical output when light shines on the photosensitive surface or area 12. Since the solar cell 10 is a photovoltaic device, it can produce a voltage and/or current output between its terminals of levels dependent upon the amount of light shining on the photoactive surface. It may be noted that the resistance of photosensitive devices changes with the light that falls on them, and such changes can be useful in testing photoconductive devices by measuring resistance change as a light-dependent output. The test method of the invention includes the directing of a narrow beam 18 from a source 20 to form a narrow spot 22 on the photoactive surface 12 of the cell. The light spot 22 is moved in a scanning pattern over the surface 12 to cover substantially the entire active cell area. During the scanning of the beam, the electrical output of the cell is monitored to detect changes in the output that indicate anamolies in the surface of the cell.

The detection of variations in cell output can be accomplished by the use of a cathode ray tube type video display device 24 with a screen 26 that generates a scanning pattern corresponding to the scanning pattern of the light spot 22 on the surface of the solar cell. That is, the display 28 on the screen has numerous points which each correspond to a point on the solar cell. The brightness of each point on the display 28 corresponds to the level of output from the solar cell at the time when the light spot 22 was directed on the corresponding point of the cell. For example, the point 12a on the cell surface corresponds to a point 28a on the video display, so that the brightness of the display point 28a corresponds to the level of cell electrical output at the time when the scanning spot 22 lies on the cell point 12a.

The video display 28 can be obtained by moving the light spot 22 in a television like scanning raster over the cell surface 12, and generating a video raster on the screen 26 which is synchronized with the movement of the light spot 22. The intensity of the beam of the video display is made dependent upon the output of the cell during the simultaneous scanning of the beam 22 and the scanning of the cathode ray tube spot on the screen 26. A pair of contacts 30, 32 can be utilized to connect a small resistance resistor 34 between the solar cell terminals 14, 16, to operate the cell in a current mode, and an input 36 of the video display device can be connected across the resistor 34 to measure the voltage thereacross and therefore the current generated by the solar cell. A person viewing the screen 26 can readily determine the locations of areas of sudden changes in brightness such as sudden decreases in brightness, to locate anomalies in the surface of the cell.

FIG. 2 is a more detailed view of an anomaly detection apparatus similar to the type shown in FIG. 1. The light source 20 includes a laser 40 and an expander and focusing lens assembly 42, for generating the narrow beam 18. A scanner 44 is utilized, which can be of a type that includes a first oscillating mirror 46 that reflects the light onto a second oscillating mirror 48, that in turn reflects the light onto the solar cell 10. The mirror 48 oscillates about an axis 49 to rapidly scan the light beam in an X direction, while the other mirror 46 slowly pivots about an axis 50 to advance the light beam in a Y direction, to produce an X-Y scanning pattern. A scan control 52 can be utilized to control the positions of the mirrors. The actual positions of the mirrors can be monitored, and signals representing their positions delivered over conductors 54, 56 to the video display device, to control X and Y deflection coils so as to produce a raster pattern on the screen. The output of the cell, which is delivered over the line 36, is delivered to the intensity-controlling input terminal of the video display device, to control the intensity of the scanning spot.

A typical solar cell may be circular with a diameter of about four inches. The scanning spot 22 can be formed with a diameter such as 8 mil (thousandth of an inch), and with successive scan lines on the cell surface spaced 8 mil apart, to produce a 500-line scan raster over a four-inch diameter solar cell. Optical scanners could be utilized which would enable scanning of the entire cell very rapidly. However, the response time of the cell is limited, and therefore the scan may have to proceed at a moderate speed, so that, for example, it may require ten seconds to scan the entire cell. The video display device 24 may be a cathode ray tube device with medium persistence so that an entire raster pattern can be seen at the completion of the scan, to enable the observance of irregularities in the light intensity of the display. The ability to observe all or a large portion of the display at one time is useful in picking out anomalies such as cracks which may show up as a dark line extending a small distance in any direction on the screen, and which is most noticeable when the entire line can be seen in the display on the screen. Although a medium persistence video display is useful, better resolution is normally obtainable with short decay cathode ray tubes. A detailed photographic display can be obtained by the use of a separate short persistence video display device 55 together with a camera 57 that photographs the screen 59 of the video display device during a scan.

FIG. 3 shows a test set-up 60 which enables the creation of an entire simultaneous display representing the output from different points of the solar cell 10, utilizing a short decay video display device 62 which has high resolution. This is accomplished by utilizing a storage device 64 to store the outputs from the cell 10 as they are generated, and to then repeatedly deliver them to the video display device 62. The memory device 64 can include a memory 66 which receives output signals from the solar cell delivered to a line 36, and passing through a filter 64 to enter the register.

The address of the input data is also entered into the memory by use of a memory address circuit 68. After the scan of the cell is completed, a programmable readout circuit 70 is operated to read out the information in the memory 66, to generate signals on line 72 representing the intensity of the cell output, and signals on lines 74 and 76 representing the X and Y positions of cell locations. A display clock 78 that controls the readout speed, can read out the data much faster than a clock 79 controls scanning of the light beam on the cell. Thus, a narrow beam such as one of four mil diameter may be utilized to scan a four-inch diameter solar cell, in a 1,000-line raster. After perhaps a twenty second period during which the scan is generated and recorded in the memory device 64', the information in the register is repeatedly delivered to the display device 62, to generate a detailed scan image representing the outputs from different points on the solar cell. A similar display device 65 which also includes a camera for taking a picture of the screen may be included to provide a picture to aid in analyzing the solar cell.

In the apparatus of FIG. 3, a bias light source 80 is provided which illuminates the entire cell with a low level of light during the scanning of the light beam 18 over the cell. The use of a bias light source enables the test to be conducted under conditions more closely simulating the actual operation of the cell, such as to lower the resistance of portions of the cell adjacent to the illuminated location, and is useful because defects may display different characteristics under different bias levels. It also may be noted that a chopper drive 82 can be provided to drive a shutter that rapidly modulates the beam 18 by interrupting it, and also to drive the filter 64. This is especially useful where a bias light source 80 is provided, since the bias light source 80 will generate a DC signal, and the interrupted narrow beam 18 will generate an AC signal which can be the only signal passed through the filter 64. It is also possible to utilize a separate photo detection device that detects reflections from the surface 12 of the solar cell, and create a video display representing the reflection intensity versus position of the scanning beam on the solar cell.

Although a broad spectrum light source can be utilized to scan a solar cell, a laser can be useful to detect the effects on the cell output for a very narrow spectrum of incident light. In FIG. 3, a first laser 40 is shown providing the light beam 18. The laser 40 can be of a helium-neon type that generates a relatively long wavelength that penetrates deeply into the surface of the cell, so that the cell output is largely determined by the characteristics of a deep surface layer of the cell. After scanning with the first laser 40, a second laser 84 can be utilized which is of an argon-type that produces a shorter wavelength, which does not penetrate deeply into the surface, so that the output of the cell is more dependent upon the extreme surface condition.

In conducting a test on the solar cell for research and development, a scan of the entire cell may first be made to try to find anomalies in the surface, to enable changes in the manufacturing steps that can avoid harmful anomalies. Such anomalies as small cracks in the surface, contaminated junction areas that reduce sensitivity, crystallographic defects that reduce sensitivity, and the like can be found by the scanning technique of the invention. Occasionally, areas of unusually high efficiency can be detected, and the reasons for this high efficiency can be investigated to try to raise the efficiency of the rest of the cell. After a general scan of the cell, areas containing anomalies can be scanned in greater detail, by refocusing the beam 18 so as to create an even smaller diameter spot, and by using the smaller diameter spot to scan only a limited area of the solar cell. For example, if anomalies are found in a small area of the cell which may be, for example, a square of 1/10th inch length per side, then only that small area may be scanned by a very fine beam which is only 0.2 mil diameter. The same set-up such as that shown in FIG. 2 can be utilized, but with the X and Y deflection coils of the display device 24 driven so that the small scanned area covers the entire video screen.

In the testing of mass produced solar cells, it is possible to utilize an anomaly-detecting circuit connected to the output of the cell, to detect decreases in the electrical output of the cell as a scanning beam scans the cell surface, and to indicate a defect if a drop of output below a certain level or over more than a certain area is detected. It is also possible to utilize an inspector who merely views the display device 24 for every cell, or for only those cells that have been picked out by an automatic circuit which first monitors the cell output when scanned by the beam.

The same general approach utilized in detecting anomalies in a solar cell, can be utilized to detect defficient cells in an array of solar cells. FIG. 4 illustrates a module 90 which includes a group of many solar cells contained on a frame 92 with the cells all interconnected to a pair of terminals 94, 96 of the module. A large number of cells may typically be connected in series to produce a large voltage output, and the interconnection is typically performed at the factory where the module is constructed. If the module is found to perform poorly, either in the factory or in the field, then it is normally helpful if the cells or cell portions performing poorly can be quickly detected without any disassembly. In accordance with the present invention, nondestructive testing of a module can be accomplished by utilizing a light source 98 that generates a beam 100 narrow enough that it covers only a small portion of any one solar cell 102. The beam 100 is scanned across the array, while the output of the array, such as the current flowing between the array terminals 94, 96 through a small resistance resistor 104, is monitored by a video display sensing device 106. The display 108 formed on the video device corresponds to the array 90, with the brightness of the display at each point thereof corresponding to the output of the array when the beam is directed onto a corresponding one of the cells of the array. Thus, the display point 108a corresponds to a point 102a on a cell, and the intensity of the display at 108a corresponds to the output from the array when the light beam 100 was directed onto the cell location 102a. An automatic mechanism for scanning the beam 100 similar to the scanner 44 of FIG. 2 can be utilized, and with the position of the scanner elements controlling the X and Y deflection coils of the display device 106. Of course, a technician could monitor a voltmeter to detect decreased output, and scan the light source by hand over the array, although a video display normally enables a faster and more detailed analysis to be made.

Solar cells may be securely connected together at a factory not only into modules, but also with the modules securely connected together into a panel 110, as shown in FIG. 5, with the panel containing many modules 112. Field testing of the modules of a panel, or of the entire panel, can be performed by a testing apparatus 114 of the construction shown in FIGS. 5 and 6, which includes a laser 116 and a scanner 118 that can scan the laser output in a scanning pattern using a beam much narrower than a single solar cell. Where connections to the terminals 120, 122 of a single module 112a can be made, the scanner can be positioned and adjusted as shown in FIG. 5 to scan just that module. At the same time, wires 124, 126 connected to the module terminals, carry the output to a video display device 128 to enable the viewing of the electrical output vs. position characteristics on a screen 130. A chopper (not shown) interrupts the laser so that the module produces an ac signal, while isolating capacitors 132 are connected in series with the wires 124, 126 to isolate the high voltage dc output of the module if it is exposed to indirect ambient daylight. Where it is difficult to make connections to the individual modules of a panel, or where an initial panel test is desired, the wires 124, 126 may be connected to the output terminals 134, 136 of the panel, as indicated in phantom lines in FIG. 5. Also, the testing apparatus will be repositioned so the laser beam can cover the entire panel.

It may be noted that for scanning a single cell or an array of cells, it is possible to have the display brightness directly proportional to the current or other output from the cell or array, or to use some other function of correspondence. For example, the displayed brightness can be made to vary logrhythmically with the current output of a cell, so that the brightness of the display decreases to a very low level when the output of a cell decreases moderately. It is also possible to have the display brightness made inversely proportional to the output of the cell or array, so that a defect that produces a drop in cell or array output results in a bright spot on the video display.

Thus, the invention provides a method and apparatus for detecting anomalies in a photosensitive device such as a solar cell or a module or panel containing a group of solar cells, which enables rapid and sensitive testing of the device. This can be accomplished by scanning a light beam over all or a large area of the photosensitive device, with the light beam much narrower than the scanned area, and by monitoring the electrical output of the entire device to detect variations in electrical output as the light beam covers different locations on the device. It may be noted that a light beam does not necessarily have to be in the visible range, but may extend to the far ultraviolet or far infrared or beyond. The output of the photosensitive device can be monitored by the use of a video display, with each point of the display corresponding to a point on the scanned area of the device, and with the intensity of the display at each point corresponding to the output of the device when the narrow beam lay on the corresponding location of the device. The scanning technique can be utilized in the research and development of solar cells, in the inspection of mass production cells, and in the testing of modules and panels especially in the field to determine which portions of the many interconnected cells are malfunctioning.

Although particular embodiments of the invention have been described and illustrated herein, it is recognized that modifications and variations may readily occur to those skilled in the art, and consequently, it is intended that the claims be interpreted to cover such modifications and equivalents.

The embodiments of the invention in which an exclusive property or privilege is claimed are defined as follows:

1. A method for detecting anomalies in a photo sensitive device that has electrical terminals for producing an output dependent upon incident light, comprising:
   moving a narrow light beam in a scanning pattern along said photo sensitive device;
   storing in a memory, a succession of signals representing the level of the output from said device as the beam is moved to a succession of locations on the surface of the device; and
   repeatedly generating a raster pattern on the screen of a cathode ray tube means, with the intensity of different points on said screen controlled by different signals stored in said memory, whereby to enable clear viewing of the pattern on a cathode ray tube of the effects of a beam that is scanned over the device during an extended period of time.

2. A method for detecting anomalies in a photo sensitive device that has electrical terminals for producing an output dependent upon incident light, comprising:
   directing a narrow light beam which covers a small portion of the light sensitive area of the device successively onto different areas of the device;
   sensing the variation in electrical output from said terminals as said beam covers said different areas of the device; and
   directing a bias light source onto said photo sensitive device to cover substantially all of the light sensitive area thereof, while directing said narrow light beam onto small portions of the light sensitive area, with said bias light source illuminating said device at a lower intensity than said narrow beam.

3. A method for detecting anomalies in a photo sensitive device that has electrical terminals for producing an output dependent upon incident light, comprising:
   directing a narrow light beam which covers a small portion of the light sensitive area of the device successively onto different areas of the device;
   sensing the variation in electrical output from said terminals as said beam covers said different areas of the device;
   directing a bias light source onto said photo sensitive device to cover substantially all of the light sensitive area thereof, while directing said narrow light beam onto small portions of the light sensitive area; and
   modulating the intensity of said narrow light beam and filtering the output of said device at the modulating frequency.

4. Apparatus for detecting anomalies in a photo sensitive device that has electrical terminals for producing an output dependent upon incident light, comprising:
   means for moving a narrow light beam in a scanning pattern along said photo sensitive device;
   memory means responsive to said light beam moving means for storing a succession of signals representing the level of output from said device as the beam is moved to a succession of locations on the surface of the device; and
   means coupled to said memory means for repeatedly generating a raster pattern on the screen of a cathode ray tube means, with the intensity of different points on said screen controlled by different signals stored in said memory, whereby to enable clear viewing of the pattern on a cathode ray tube of the effects of a beam that is scanned over the device during an extended period of time.

5. Apparatus for detecting anomalies in a photo sensitive device that has electrical terminals for producing an output dependent upon incident light, comprising:
   means for directing a narrow light beam which covers a small portion of the light sensitive area of the device, successively onto different areas of the device;
   means for sensing the variation in electrical output from said terminals as said beam covers said different areas of the device; and
   means for directing a bias light source onto said photo sensitive device to cover substantially all of the light sensitive area thereof but at a lower intensity than said narrow beam.

6. Apparatus for detecting anomalies in a photo sensitive device that has electrical terminals for producing an output dependent upon incident light, comprising:
   means for directing a narrow light beam which covers a small portion of the light sensitive area of the device successively onto different areas of the device;
   means for sensing the variation in electrical output from said terminals as said beam covers said different areas of the device;
   means for directing a bias light source onto said photo sensitive device to cover substantially all of the light sensitive area thereof; and
   means for modulating the intensity of said narrow light beam and filtering the output of said device at the modulating frequency.

7. An apparatus for detecting anomalies in a photosensitive device that has electrical terminals that produce an output dependent upon incident light, which includes a scanner which scans the photosensitive device with a narrow light beam, and a video displayer which displays the output of the photosensitive device as a function of the position of the narrow light beam on the photosensitive device, the improvement comprising:
   storage device means having an input connectable to said electrical terminals of said photosensitive device and an input connectable to said scanner, for recording the output of said photosensitive device as a function of the position of the beam thereon, said storage device means having an output connectable to said video displayer for operating it to display an image representing the output of said photosensitive device as a function of the position of the beam thereon.

8. The apparatus described in claim 7 wherein:
   said storage device means is operable to deliver data over said output representing the output of said photosensitive device as a function of the beam position thereon, at a faster rate than it receives data representing the output of said photosensitive device as a function of beam position thereon over said inputs.

9. An apparatus for detecting anomalies in a photosensitive device that has electrical terminals that produce an output dependent upon incident light, which includes a scanner which scans the photosensitive device with a narrow beam light, and which also includes a means for sensing variations in electrical output from the terminals as the beam is directed to different areas of the device, the improvement comprising:
   means for directing biasing light onto the photosensitive device to cover substantially all of the light sensitive area thereof, while said scanner is scanning said photosensitive device, said means for directing a biasing light being constructed to illuminate said light sensitive area at a lower intensity than said narrow beam.

10. The improvement described in claim 9 including:

means for modulating the intensity of light from said scanner; and filter means coupled to the output of said photosensitive device for filtering the output therefrom at the frequency at which said modulating means operates.

* * * * *